United States Patent [19]

Francotte et al.

[11] Patent Number: 5,026,841

[45] Date of Patent: Jun. 25, 1991

[54] PROCESS FOR THE PREPARATION OF FINELY DIVIDED POROUS CELLULOSE PARTICLES

[75] Inventors: Eric Francotte, Nuglar, Switzerland; Gabriele Baisch, Weil-Friedlingen, Fed. Rep. of Germany

[73] Assignee: Ciba-Geigy Corporation, Ardsley, N.Y.

[21] Appl. No.: 367,163

[22] Filed: Jun. 16, 1989

[30] Foreign Application Priority Data

Jun. 24, 1988 [CH] Switzerland ............ 2432/88

[51] Int. Cl.$^5$ .......... C08B 3/00; C08B 5/00; C08B 7/00; C08B 3/16
[52] U.S. Cl. .......... 536/58; 536/63; 536/64; 536/65; 536/68; 536/76; 536/82; 536/83
[58] Field of Search .......... 536/58, 63, 64, 65, 536/68, 76, 79, 80, 81, 82, 83

[56] References Cited

U.S. PATENT DOCUMENTS 4,312,980 1/1982 Motozato et al. .......... 536/76
4,461,892 7/1984 Nishikawa et al. .......... 536/65

OTHER PUBLICATIONS

Reactive Polymers I, pp. 145-147 (1983).

*Primary Examiner*—Nathan M. Nutter
*Attorney, Agent, or Firm*—Stephen V. O'Brien

[57] ABSTRACT

Process for the preparation of finely divided porous cellulose in the form of essentially spherical particles by formation of a suspension, in which an organic solution of a cellulose ester of aromatic or aromatic-aliphatic carboxylic acids containing a $C_5$-$C_{12}$alkanol is stirred into an aqueous solution of an anionic surfactant, the solvent is removed and the particles are isolated and hydrolyzed under heterogeneous conditions. They are suitable as adsorbents in e.g. chromatographic processes.

20 Claims, No Drawings

PROCESS FOR THE PREPARATION OF FINELY DIVIDED POROUS CELLULOSE PARTICLES

The invention relates to a process for the preparation of finely divided cellulose in the form of essentially spherical particles having a high specific surface area by the suspension method.

It is known that finely divided cellulose is suitable for very widely varying uses as a stationary phase in chromatographic processes, for example in permeation chromatography. The preparation of spherical cellulose particles is also known. Spray or suspension processes are in general used.

In Reactive Polymers, I, pages 145-147 (1983), J. Stamberg et al. describe a suspension process in which an aqueous solution of cellulose xanthogenate is dispersed using a water-immiscible stirring, and a sol-gel transition is achieved by heating, the xanthogenate groups being split off at the same time.

A process for the preparation of spherical porous cellulose particles is described in EP-A-0,025,639. In this process, an organic solution of cellulose triacetate containing a longer-chain alcohol is suspended, while stirring, in an aqueous phase containing a higher molecular weight dispersing agent, for example polyvinyl alcohol or gelatin. When the organic solvent has been removed, the cellulose triacetate particles obtained are isolated, purified and then hydrolyzed. Our own investigations have shown that the cellulose particles obtained by this process have only a low specific surface area and therefore a correspondingly low affinity as adsorbents.

It has now been found that considerably higher specific surface areas can be achieved in the suspension process if cellulose esterified with aromatic or aromatic-aliphatic carboxylic acids instead of with aliphatic carboxylic acids is used, and an anionic surfactant is used as the dispersing agent instead of a higher molecular weight dispersing agent.

The invention relates to a process for the preparation of finely divided porous cellulose in the form of essentially spherical particles having an average diameter of 1 to 200 μm and a specific surface area of at least 10 $m^2/g$, in which a solution of a cellulose ester in an organic solvent containing 1 to 50% by volume, based on the amount of solvent, of a $C_5-C_{22}$ alkanol is slowly added, with vigorous stirring, to a solution of a dispersing agent in water, the organic solvent is removed, while stirring is continued, the solid particles are isolated and the carboxylic acid groups are then split off under heterogeneous conditions, wherein the organic solution contains a cellulose ester of aromatic or aromaticaliphatic carboxylic acids and the water contains an anionic surfactant.

It has proved advantageous for the solid particles to be isolated before the carboxylic acid groups are split off and to be purified by washing out with non-solvents, for example alkanols and/or water.

The average particle diameter is preferably 3 to 100 μm, in particular 5 to 80 μm. The average particle diameter can also comprise only a relatively narrow range. Such materials can be prepared by fractionation by customary processes, for example sedimentation, sieving or sifting.

The specific surface area is preferably 10 to 200 $m^2/g$, in particular 20 to 80 $m^2/g$ and especially 30 to 70 $m^2/g$.

The finely divided cellulose prepared according to the invention can be partly crystalline. The relative crystallinity can be expressed by the heat of fusion of the partly crystalline contents of the cellulose, which is advantageously determined by calorimetric measurement, for example differential scanning calorimetry (DSC).

The carboxylic acids from which the cellulose esters are derived preferably correspond to the formula R—X—COOH, in which X is a direct bond, $C_1-C_4$ alkylene or $C_2-C_4$ alkenylene, alkylidene or alkynylene and R is mono-, bi- or tricyclic, preferably monocyclic, $C_6-C_{14}$ aryl or heteroaryl having in each case 5 or 6 ring atoms and one to three, preferably one or two, hetero atoms from the group comprising N, 0 and S, R being unsubstituted or substituted by one or more substituents from the group comprising $C_1-C_{12}$-, preferably $C_1-C_4$ alkyl, $C_1-C_{12}$-, preferably $C_1-C_4$ alkoxy, $C_1-C_{12}$-, preferably $C_1-C_4$ alkylthio, phenyl, phenoxy, phenylthio, benzyl, benzyloxy, benzylthio, cyano, halogen, $C_1-C_8$ acyl, $C_1-C_8$ acyloxy, hydroxyl, $C_1-C_{12}$ alkoxycarbonyl, phenoxycarbonyl, benzyloxycarbonyl, nitro or di(C-1-$C_6$ alkyl)amino. Preferred substituents are methyl, ethyl and methoxy.

Alkylene X preferably contains 1 to 3 and in particular 1 or 2 C atoms. Alkenylene, alkylidene or alkynylene X preferably contains 2 or 3 C atoms. The alkylene, alkenylene and alkynylene can be linear or branched. Examples are methylene, ethylene, ethylidene, ethenylene, ethynylene, 1,2- or 1,3-propylene, 1,1- or 2,2-propylidene, 1,2- or 1,3-prop-1-enylene or 1,2- or 1,3-prop-2-enylene, 1,3-propynylene, 1,2-, 1,3-, 1,4- or 2,3-butylene, 1,1- or 2,2-butylidene, 1,2-, 1,3- or 1,4-but-1-enylene, -but-2-enylene or -but-3-enylene and 1,2-, 1,3- or 1,4-but-1-ynylene, -but-2-ynylene or but-3-ynylene. X is particularly preferably $C_1-C_3$ alkylene, $C_2-C_3$ alkylidene or -alkenylene or a direct bond. X is especially a direct bond, methylene, ethylene or ethenylene. In a preferred embodiment, X is a direct bond or 1,2-ethenylene.

Aryl R preferably contains 6 to 10 C atoms. The aryl can be fused with alkylene or alkenylene having 2 to 4 C atoms. Examples of aryl are phenyl, naphthyl, phenanthryl, anthracyl, indenyl, indanyl, fluorenyl, fluorenonyl, anthraquinonyl, xanthonyl and thioxanthonyl. R is preferably naphthyl, and in particular phenyl.

Heteroaryl R preferably contains 1 hetero atom from the group comprising S and N. The heteroaryl can be fused with phenylene. Examples of heteroaryl are furyl, thionyl, pyrryl, benzofuryl, benzothionyl, indyl, pyridyl, pyrimidyl, quinolinyl and isoquinolinyl. Pyridyl is particularly preferred.

The radical R can be substituted by one or more, preferably one to three and in particular one or two substituents from the group comprising $C_1-C_{12}$-, in particular $C_1-C_4$ alkyl, alkoxy or alkylthio, for example methyl, ethyl, n- or i-propyl, n-, i- or t-butyl, pentyl, hexyl, heptyl, octyl, nonyl, decyl, undecyl, dodecyl and corresponding alkoxy or alkylthio radicals; methyl, ethyl, methoxy and ethoxy are particularly preferred; phenyl, phenoxy, phenylthio, benzyl, benzyloxy and benzylthio, preferably phenyl or benzyl; hydroxyl, cyano, halogen, in particular F, $C_1$ and Br; $C_1-C_8$-, preferably $C_1-C_4$ acyl or acyloxy, for example acetyl, chloroacetyl, dichloroacetyl, trichloroacetyl, fluoroacetyl, trifluoroacetyl, propionyl, butanoyl, benzoyl and phenylacetyl and corresponding acyloxy radicals; and $C_1-C_{12}$-, preferably $C_1-C_4$ alkoxycarbonyl and phenoxy- and benzyloxycarbonyl.

In a preferred embodiment, the substituents are $C_1$–$C_4$ alkyl, in particular methyl or ethyl.

In a preferred embodiment, X is a direct bond, $C_1$–$C_3$ alkylene or $C_2$–$C_3$ alkenylene and R is unsubstituted or substituted phenyl, naphthyl or pyridyl. X here is particularly preferably a direct bond, methylene, ethylene or ethenylene.

In a particularly preferred embodiment, R is phenyl which is unsubstituted or substituted by methyl or ethyl and X is a direct bond.

The cellulose esters can be prepared by known esterification processes. The degree of polymerization can be between 5 and 1000, preferably 5 to 500 and in particular 10 to 50.

The degree of esterification of the cellulose ester can be 1 to 3, preferably 2 to 3 and in particular 2.5 to 3. The degree of esterification which can be achieved can depend on the reactivity of the carboxylic acid used.

The particle size can be influenced by the stirring speed, which can be, for example, 100 to 1000 revolutions/minute, as well as the amount of cellulose ester in the organic solvent and the rate of addition of the organic solution to the aqueous phase.

The specific surface area can be influenced by the reaction conditions, for example the choice of solvent, alcohol and surfactant; the reaction procedure, for example rate of addition and stirring and rate of evaporation; and the proportions of solvent, water, alkanol, surfactant and cellulose ester.

The amount of cellulose ester in the organic solvent can be, for example, 1 to 20, preferably 1 to 12% by weight, based on the solvent.

It may be advantageous to use an essentially water-insoluble solvent.

The organic solvent advantageously has a lower boiling point than water. Examples of suitable solvents are aromatic hydrocarbons, halogenohydrocarbons, in particular fluoro- and/or chlorohydrocarbons, cyclic ethers, carboxylic acid esters and ketones. Examples are benzene, toluene, xylene, methylene chloride, chloroform, trichlorofluoromethane, chloroethane, trifluorotrichloroethane, dichlorotetrafluoroethane, acetone, methyl ethyl ketone, diethyl ketone, cyclohexanone, ethyl acetate, tetrahydrofuran and dioxane, or mixtures of such solvents. Methylene chloride and tetrahydrofuran are particularly preferred.

It is also possible to use solvents which have a higher boiling point than water, for example toluene, xylene, chlorobenzene and ethylene glycol ether or diethylene glycol ether. The solvent is then removed together with water. It is advantageous here for the water removed to be replaced again, for example during the distillation, or for a correspondingly higher amount of water to be initially introduced.

The organic solution contains an alkanol, preferably in an amount of 5 to 40% by volume. The alkanol can be branched or, preferably, linear. It preferably contains 7 to 16 and in particular 7 to 12 C atoms. Examples are pentanol, hexanol, heptanol, octanol, nonanol, decanol, undecanol, dodecanol, tridecanol, tetradecanol, hexadecanol, octadecanol and eicosanol. The alkanols are preferably essentially insoluble in water. Linear $C_7$–$C_{10}$ alkanols are particularly preferred.

The volume ratio of the organic solution to the aqueous phase is preferably 10:1 to 1:10, in particular 5:1 to 1:5 and especially 3:1 to 1:3.

The aqueous solution preferably contains the anionic surfactant in an amount of 0.05 to 10, preferably 0.1 to 5% by weight, based on the amount of water.

The anionic surfactant can be, for example, an acid, a half-ester of di-, tri- or tetrabasic, in particular di- or tribasic acids or salts thereof. Examples of suitable salts are the ammonium, alkali metal (in particular sodium and potassium) or alkaline earth metal (in particular magnesium and calcium) salts.

The acids and half-esters contain, for example, linear or branched $C_3$–$C_{20}$alkyl groups or phenyl groups substituted by 1 to 3 $C_1$–$C_{20}$alkyl. The acids can also contain $C_1$–$C_{20}$perfluoroalkyl groups. Examples of suitable acids are mono- or dicarboxylic acids, sulfonic acids, phosphonic acids and phosphinic acids. Suitable polybasic acids for halfesters are, for example, sulfuric acid, phosphoric acid, phosphorous acid, malonic acid and maleic acid. A large number of such surfactants are described in the National Standard Reference Data System (NSRDS), National Bureau of Standards (U.S.) 36, pages 24–32, U.S. Government Printing Office (1971). $C_8$–$C_{16}$ Half-esters of sulfuric acid, in particular lauryl sulfate, are preferred.

The process can be carried out by a procedure in which the solution of the cellulose ester is added dropwise to the aqueous phase, while stirring, and the organic solvent is then removed, while stirring is continued, advantageously by distillation while heating up to the boiling point of the solvent and/or in vacuo. The suspension can then be used directly for ester cleavage or the particles are isolated, for example by decanting or filtration. The particles can subsequently be purified, for example by washing out with water and a hydrophilic solvent, advantageously with a $C_1$C$_4$alkanol. The material can then also be dried.

The carboxylic acid groups can be split off under heterogeneous conditions by processes which are known per se. In a preferred embodiment, a procedure is followed in which the heterogeneous splitting off is carried out under hydrolysis in an aqueous-alcoholic or alcoholic suspension of the cellulose ester particles using a base. Examples of suitable nonsolvents are alkanols (methanol, ethanol, propanol or butanol), water or mixtures of alkanols and water. The splitting off can be carried out by hydrolysis under acid or, preferably, basic conditions. Suitable acids are, in particular, inorganic acids, such as, for example, HCl, HBr and $H_2SO_4$. Possible bases are amines or, above all, alkali metal carbonates, hydroxides and $C_1$–$C_6$alcoholates, for example $Na_2CO_3$, $K_2CO_3$, $Li_2CO_3$, LiOH, NaOH, KOH, $NaOCH_3$, $NaOC_2H_5$ or $LiOC_2H_5$. In a preferred embodiment, dilute, for example 5–20%, NaOH and ethanol are used as non-solvents. The carboxylic acid groups can also be split off using metal hyrides, for example LiH, NaH, $LiAlH_4$ or $NaBH_4$. The process can be carried out by a procedure in which the cellulose ester particles are swollen in the non-solvent, if appropriate while heating, the suspension is then allowed to cool and the hydrolyzing agent is then added. The suspension is preferably stirred at room temperature, the cellulose particles are isolated, for example, by decanting or filtration and the cellulose particles are purified in the customary manner by washing out with water, alkanols and/or hydrocarbons. The material is then also dried.

With the process according to the invention, surprisingly, cellulose is obtained in the form of essentially spherical particles which have a high porosity (specific surface area), which is important for chromatographic processes and other applications.

The invention furthermore relates to the cellulose particles prepared by the process according to the invention.

The cellulose particles prepared according to the invention can be used, for example, as filling substances; carriers for filtration, purification or adsorption operations, carriers for fixing inorganic or organic substances; carriers for enzyme or protein immobilization or purification or carriers for pharmacological active ingredients (see, for example, J. Stamberg et al., Bead Cellulose, Affinity Chromatography and related Techniques, pages 131-141, (1982), Elsevier Scient. Publ. Comp., Amsterdam).

The following examples illustrate the invention in more detail. Percentages are percentages by weight, unless mentioned otherwise.

EXAMPLE 1 a) 124 ml of heptanol are added to 36.6 g of cellulose tribenzoate in 1000 ml of methylene chloride. The resulting solution is added dropwise at room temperature to a 0.75% sodium lauryl sulfate solution (2200 ml) stirred at 400 revolutions per minute. The methylene chloride is then evaporated off at 40°-42° C. (bath temperature) under the same stirring speed. The residue is filtered off and washed with water and ethanol. The pulverulent product is dried in a vacuum cabinet at 80° C. (20 hours). Yield: 35.1 g (96% of theory). The spherical particles having a diameter of 10-30 μm can be fractionated by sieving or sedimentation as required. The physical properties of the product are determined as follows:

Specific surface area: 43.7 m$^2$/g. The specific surface area (m$^2$/g) is determined by the BET method.

Crystallinity: 19.3 J/g. The relative crystallinity is determined from the heat of fusion $\Delta H$ (J/g) with the aid of DSC (differential scanning calorimetry; Mettler TA3000).

b) 10 g of the tribenzoyl-cellulose beads are swollen in 200 ml of ethanol (75% in water) at 50°-60° C. for 30 minutes. The suspension is cooled and 150 ml of a 10% strength aqueous NaOH solution are added. The solution is stirred at room temperature for 20 hours and filtered and the cellulose beads are rinsed with water, ethanol and then with hexane. The product is dried in a vacuum drying cabinet at 50° C. (analysis: calculated: C 44.45%, H 6.22%, O 49.34%; found: C 44.64%, H 6.37%, O 49.19%; specific surface area: 55 m$^2$/g; diameter: 10-20 μm).

EXAMPLE 2

5 g of the tribenzoyl-cellulose beads according to Example 1a are stirred in a sodium methylate solution (0.87 g of sodium/50 ml of methanol) at 50° C. for 1 hour. The suspension is filtered and the residue is rinsed with water, ethanol and then hexane. The product is dried at 50° C. in vacuo. (Analysis: calculated: C 44.45%. H 6.22%. O 49.34%; found: C 43.30%, H 6.50%, O 49.43%; specific surface area: 14.5 m$^2$/g; diameter: 5-15 μm).

EXAMPLE 3 a) Analogously to Example 1a), 10 g of cellulose tri(paramethylbenzoate) are treated with 50 ml of heptanol and 240 ml of 0.7% sodium lauryl sulfate solution in 300 ml of methylene chloride and the product is isolated (specific surface area: 77.1 m$^2$/g; H: 10.6 J/g; diameter: 3-10 μm).

b) Analogously to Example 1b), 5 g of the para-methyl-benzoyl-cellulose beads are stirred with 50 ml of ethanol (75% in water) and 50 ml of 10% sodium hydroxide solution at room temperature for 20 hours and then isolated. (Analysis: calculated: C 44.45%, H 6.22%, O 49.34%; found: C 44.29%, H 5.98%, O 48.86%; specific surface area: 58.1 m$^2$/g; diameter: 2-5 μm).

What is claimed is:

1. A process for the preparation of finely divided porous cellulose in the form of essentially spherical particles having an average diameter of 1 to 200 μm and a specific surface area of at least 10 m$^2$/g, in which a solution of a cellulose ester in an organic solvent containing 1 to 50% by volume, based on the amount of solvent, of a C$_5$-C$_{22}$alkanol is slowly added, with vigorous stirring, to a solution of an anionic surfactant in water, the organic solvent is removed, while stirring is continued, the solid particles are isolated and the carboxylic acid groups are then split off under heterogeneous conditions, wherein the solution of a cellulose ester in an organic solvent contains a cellulose ester of aromatic or aromatic-aliphatic carboxylic acids.

2. The process according to claim 1, wherein the solid particles are washed out and dried before the carboxylic acid groups are split off.

3. The process according to claim 1, wherein the organic solvent has a lower boiling point than water.

4. The process according to claim 1, wherein the solvent is an aromatic hydrocarbon, a halogenohydrocarbon, a cyclic ether, a carboxylic acid ester or a ketone.

5. The process according to claim 1, wherein the alkanol contains 7 to 16 C atoms.

6. The process according to claim 1, wherein the alkanol contains 7 to 12 C atoms.

7. The process according to claim 1, wherein the alkanol is present in an amount of 5 to 40% by volume, based on the amount of organic solvent.

8. The process according to claim 1, wherein the surfactant is an acid, a half-ester of a di-, tri- or tetrabasic acid or a salt thereof.

9. The process according to claim 1, wherein the surfactant is lauryl sulfate.

10. The process according to claim 1, wherein the volume ratio of the organic solution to the aqueous phase is 10:1 to 1:10.

11. The process according to claim 1, wherein the average diameter is 3 to 100 μm.

12. The process according to claim 1, wherein the average diameter is 5 to 80 μm.

13. The process according to claim 1, wherein the specific surface area is 10 to 200 m$^2$/g.

14. The process according to claim 1, wherein the specific surface area is 20 to 80 m$^2$/g.

15. The process according to claim 1, wherein the cellulose is esterified with a carboxylic acid of the formula $$R-X-COOH$$

in which X is a direct bond, C$_1$-C$_4$alkylene or C$_2$-C$_4$alkenylene, alkylidene or alkynylene and R is mono-, bi- or tricyclic C$_6$-C$_{14}$aryl or heteroaryl having in each case 5 or 6 ring atoms and one to three hetero atoms from the group comprising N, O and S, R being unsubstituted or substituted by or more substituents from the group comprising $C_1$-$C_{12}$alkyl, $C_1$-$C_{12}$alkoxy, $C_1$-$C_{12}$alkylthio, phenyl, phenoxy, phenylthio, benzyl, benzyloxy, benzylthio, cyano, halogen, $C_1$-$C_8$acyl, $C_1$-$C_8$acyloxy, hydroxyl, $C_1$-$C_{12}$alkoxycarbonyl, phenoxycarbonyl, benzyloxycarbonyl, nitro or di($C_1$-$C_6$alkyl)amino.

16. The process according to claim 15, wherein X is a direct bond, $C_1$-$C_3$alkylene or $C_2$-$C_3$alkenylene and R is unsubstituted or substituted phenyl, naphthyl or pyridyl.

17. The process according to claim 15, wherein R is unsubstituted or substituted phenyl, naphthyl or pyridyl and X is a direct bond, methylene, ethylene or ethenylene.

18. The process according to claim 15, wherein R is phenyl which is unsubstituted or substituted by methyl or ethyl and X is a direct bond.

19. The process according to claim 1, wherein the heterogeneous splitting off is carried out under hydrolysis in an aqueous-alcoholic or alcoholic suspension of the cellulose ester particles, using a base.

20. A finely divided cellulose obtainable by the process according to claim 1.

* * * * *